(12) United States Patent
O'Shaughnessy et al.

(10) Patent No.: US 8,329,318 B2
(45) Date of Patent: *Dec. 11, 2012

(54) METAL BASED COATING COMPOSITION AND RELATED COATED SUBSTRATES

(75) Inventors: Dennis J. O'Shaughnessy, Allison Park, PA (US); James J. Finley, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/053,478

(22) Filed: Mar. 22, 2011

(65) Prior Publication Data

US 2011/0170176 A1    Jul. 14, 2011

Related U.S. Application Data

(60) Division of application No. 11/712,240, filed on Feb. 28, 2007, now Pat. No. 7,923,131, which is a continuation of application No. 10/931,748, filed on Sep. 1, 2004, now abandoned.

(51) Int. Cl.
*B32B 15/04* (2006.01)

(52) U.S. Cl. ........ 428/701; 428/428; 428/432; 428/698; 428/699; 428/702

(58) Field of Classification Search .................. 428/428, 428/433, 432, 434, 697, 698, 699, 701, 702, 428/704
See application file for complete search history.

(56) References Cited

U.S. PATENT DOCUMENTS

| | | | | |
|---|---|---|---|---|
| 4,749,397 | A * | 6/1988 | Chesworth et al. | 65/60.2 |
| 5,085,926 | A * | 2/1992 | Iida et al. | 428/216 |
| 5,506,037 | A * | 4/1996 | Termath | 428/216 |
| 2002/0037414 | A1 * | 3/2002 | Cunningham | 428/412 |
| 2002/0064662 | A1 * | 5/2002 | Lingle et al. | 428/432 |
| 2002/0102352 | A1 * | 8/2002 | Hartig et al. | 427/165 |
| 2003/0165693 | A1 * | 9/2003 | Hartig et al. | 428/426 |

* cited by examiner

*Primary Examiner* — Jennifer McNeil
*Assistant Examiner* — Lauren Robinson
(74) *Attorney, Agent, or Firm* — Andrew C. Siminerio

(57) ABSTRACT

A coated substrate is disclosed. The coated substrate includes a substrate and a coating composition over the substrate comprising at least one metal based layer selected from tungsten, chromium, tantalum, molybdenum, aluminum, niobium, and mixtures and alloys thereof; and mixtures and alloys of cobalt and chromium; and at least one dielectric layer including $Si_xN_y$, where x/y ranges from 0.75 to 1.5, over the metal based layer. The $\Delta E_{cmc\,(1.5:1)}$ (T), $\Delta E_{cmc\,(1.5:1)}$ (R1) and $\Delta E_{cmc\,(1.5:1)}$ (R2) of a non-heat treated, coated substrate as compared to a heat treated, coated substrate according to the present invention are no greater than 8 units.

15 Claims, No Drawings

METAL BASED COATING COMPOSITION AND RELATED COATED SUBSTRATES

CROSS REFERENCE TO RELATED APPLICATIONS

The present application is a divisional application of U.S. patent application Ser. No. 11/712,240, which was filed on Feb. 28, 2007, now U.S. Pat. No. 7,923,131, and which is a continuation application of U.S. patent application Ser. No. 10/931,748, now abandoned which was filed on Sep. 1, 2004 and is now abandoned, each of which is incorporated by reference in its entirety.

FIELD OF THE INVENTION

The present invention relates to novel functional coatings and substrates coated therewith.

BACKGROUND

Glass substrates are used for a variety of purposes, from automotive to architectural applications. Generally, glass manufacturers produce standard size glass sheets in large quantities and then cut the glass to size based on the customer requirements. Some of the glass will have to be bent into various shapes. Typically, glass is shaped using a bending process which requires heating the glass. In addition to bending, glass may be subjected to a heating operation for tempering or heat strengthening, as is well known in the art. The most efficient bending, tempering and heat strengthening processes take place at temperatures ranging between 1150° F. (621° C.) and 1450° F. (788° C.).

Depending on the end use of the glass substrate, the glass will need to exhibit various performance properties such as emissivity, visible light reflectance, color, etc. The glass substrates can be coated with a functional coating so that the substrate can achieve the desired performance properties. Functional coatings such as photocatalytic coatings, solar management coatings, low emissivity coatings, conductive coatings, etc. are well known in the art.

As can be gleaned from the above, customers often require a glass substrate that will be both coated and heat treated. In many instances, it is desirable to form a heat treated, coated substrate by first coating the substrate and then heat treating it. If the heating step is being performed to bend the glass, for example, it is simpler to apply a coating composition to a flat glass substrate and then bend the substrate than vice versa.

For a given project, such as a commercial construction project, a customer will need coated glass that has been heat treated and coated glass that has not been heat treated. Ideally, the heat treated, coated glass and the non-heat treated, coated glass will exhibit the same appearance and provide similar functional characteristics. This would be the simplest solution for both the glass manufacturer and the customer.

It has been difficult to design coating compositions for glass substrates that allow the coated substrate to have the same appearance after it has been exposed to a heating operation such as bending, tempering or heat strengthening as it did before the heating operation. It would be desirable to have a durable coating composition that can be applied to a glass substrate to provide a coated substrate having the same appearance regardless of whether or not the coated substrate has undergone a heating operation. The present invention provides such a coating composition.

SUMMARY OF THE INVENTION

In a non-limiting embodiment, the present invention is a coated substrate comprising a substrate and a coating composition over the substrate comprising at least one metal based layer selected from tungsten, chromium, tantalum, molybdenum, aluminum, mixtures thereof, and alloys of cobalt and chromium; and at least one dielectric layer including a silicon nitride having a formula of $Si_xN_y$, where x/y ranges from 0.75 to 1.5, over and adjacent to the metal based layer.

In another non-limiting embodiment, the present invention is a coated substrate comprising a first dielectric layer including a silicon nitride having a formula of $Si_xN_y$, where x/y ranges from 0.75 to 1.5, over the substrate, a metal based layer selected from tungsten, chromium, aluminum, tantalum, molybdenum, mixtures thereof, and alloys of cobalt and chromium over the first dielectric layer; and a second dielectric layer including a silicon nitride having a formula of $Si_xN_y$, where x/y ranges from 0.75 to 1.5, over the metal based layer.

In yet another non-limiting embodiment, the present invention is a coated substrate comprising a first metal based layer selected from tungsten, chromium, tantalum, molybdenum, aluminum, niobium, mixtures thereof, and alloys of cobalt and chromium over the substrate; an infrared reflective layer over the first metal based layer; and a second metal based layer selected from tungsten, chromium, tantalum, molybdenum, aluminum, niobium, mixtures thereof; and alloys of cobalt and chromium over the infrared reflective layer and a dielectric layer over the second metal based layer.

In a further non-limiting embodiment, the present invention is a method for making a coated substrate comprising depositing a metal based layer selected from tungsten, chromium, tantalum, molybdenum, aluminum, mixtures thereof; and alloys of cobalt and chromium on a substrate; and depositing a dielectric layer including a layer of $Si_xN_y$, where x/y ranges from 0.75 to 1.5, over and adjacent to the metal based layer.

In another non-limiting embodiment, the present invention is a method for modifying the R1 color of a coated substrate including a first dielectric layer including a silicon nitride having a formula of $Si_xN_y$ over the substrate, a metal based layer selected from tungsten, tantalum, chromium, aluminum, molybdenum, and mixtures and alloys thereof; and mixtures and alloys of cobalt and chromium over the first dielectric layer and a second dielectric layer including a silicon nitride having a formula of $Si_xN_y$ over the metal based layer, wherein x/y ranges from 0.75 to 1.5, comprising adjusting the thickness of the second dielectric layer.

In yet another non-limiting embodiment, the present invention is a method for modifying the R2 color of a coated substrate including a first dielectric layer including a silicon nitride having a formula of $Si_xN_y$ over the substrate, a metal based layer selected from tungsten, tantalum, chromium, aluminum, molybdenum and mixtures and alloys thereof; and mixtures and alloys of cobalt and chromium over the first dielectric layer and a second dielectric layer including a silicon nitride having a formula of $Si_xN_y$ over the metal based layer, where x/y ranges from 0.75 to 1.5, comprising adjusting the thickness of the first dielectric layer.

DESCRIPTION OF THE INVENTION

All numbers expressing dimensions, physical characteristics, quantities of ingredients, reaction conditions, and the like used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1.0 to 7.8, 3.0 to 4.5, and 6.3 to 10.0.

As used herein, the terms "on", "applied on/over", "formed on/over", "deposited on/over", "overlay" and "provided on/over" mean formed, overlay, deposited, or provided on but not necessarily in contact with the surface. For example, a coating layer "formed over" a substrate does not preclude the presence of one or more other coating layers of the same or different composition located between the formed coating layer and the substrate. For instance, the substrate can include a conventional coating such as those known in the art for coating substrates, such as glass or ceramic.

As used herein, aesthetic properties (i.e., transmitted color, reflected color and brightness) as viewed from the coated side of the substrate are referred to as R1 properties, and aesthetic properties as viewed from the uncoated side of the substrate are referred to as R2 properties.

As used herein, a coated substrate is "color stable" if $\Delta E_{cmc(1.5:1)}(T)$, $\Delta E_{cmc(1.5:1)}(R1)$ and $\Delta E_{cmc(1.5:1)}(R2)$ of the non-heat treated coated substrate compared to the heat treated, coated substrate are no greater than or equal to 8 units, for example, no greater than or equal to 5 units, or no greater than or equal to 1 unit. "Heat treated substrate" refers to a coated substrate heated to a temperature of at least 1150° F. (621° C.). The method used to calculate $\Delta E$ per the CMC color difference equation can be found in the *Principle of Color Technology* by Roy S. Berns, Third Edition, John Wiley and Sons, 117-118, (2000) which is incorporated by reference. The L*a*b* data used should be for a CIE standard illuminant D65 and a CIE standard observer angle of 10 degrees.

In a non-limiting embodiment, the present invention is a coated substrate comprising at least one metal based layer and at least one dielectric layer. According to the present invention, suitable substrates include glass, steel, ceramic, etc. In a non-limiting embodiment of the invention, the glass is made via conventional float glass processes. Suitable float processes are described in U.S. Pat. Nos. 3,083,551; 3,220,816; and 3,843,346, which are hereby incorporated by reference. In another non-limiting embodiment of the invention, the substrate is a glass float ribbon.

According to the present invention, the metal based layer has a single film or multi-film configuration and overlays the substrate. In a non-limiting embodiment of the invention, the metal based layer provides physical and chemical durability to the coated substrate and comprises a metal that is corrosion resistant, hard, and able to withstand heating for 20 minutes to a maximum temperature of 1200° F. (649° C.). Suitable materials for the metal based layer include metals such as tungsten, chromium, tantalum, molybdenum, niobium, mixtures thereof, and alloys of cobalt and chromium, which are commercially available under the Stellite® family of products from Deloro Stellite in Geshan, Ind.

In another non-limiting embodiment of the invention, the metal based layer is a highly reflective material such as aluminum.

According to the present invention, the metal based layer can have any thickness. For example, the thickness of the metal based layer can range from 1 nm to 50 nm, for example, from 2 nm to 25 nm, or 3 nm to 20 nm.

The thickness of the metal based layer can affect the visible transmittance of the coated substrate. Generally, the thicker the metal based layer, the lower the visible light transmittance of the coated substrate.

The metal based layer of the present invention can be applied using conventional techniques such as magnetron sputtered vacuum deposition ("MSVD"). Suitable MSVD methods of deposition are described in the following references, which are hereby incorporated by reference: U.S. Pat. Nos. 4,379,040; 4,861,669; and 4,900,633.

According to the present invention, a dielectric layer overlays the metal based layer. The dielectric layer provides mechanical durability and impacts the aesthetic properties of the coated substrate. The dielectric layer can be made up of a single film or multiple films. In a non-limiting embodiment of the invention, the dielectric layer is a single film immediately adjacent to the metal layer and comprises $Si_xN_y$, where x/y ranges from 0.75 to 1.5, for example, $Si_3N_4$. Optionally, a layer of titanium nitride, chromium nitride or tungsten nitride as well as mixtures thereof can be over the dielectric layer.

In another non-limiting embodiment of the invention, the dielectric layer is made up of multiple films. For example, the multiple film configuration can comprise (i) a first dielectric film comprising $Si_xN_y$ having an index of refraction; (ii) a second dielectric film over the first dielectric film having an index of refraction lower than the index of refraction of the first dielectric film; and (iii) a third dielectric film comprising $Si_xN_y$ over the second film. In one non-limiting embodiment of the invention, the second dielectric film has an index of refraction that is at least 0.25, for example, at least 0.2 or at least 1.8, less than the index of refraction of the first $Si_xN_y$ film. An example of a suitable material for the second dielectric film is silicon dioxide.

The dielectric layer can be any thickness. For example, the thickness of the dielectric layer can be at least 5 nm, for example, from 10 nm to 50 nm, or from 20 nm to 40 nm.

Generally, the thickness of the dielectric layer has a dominant effect on the R1 aesthetic properties of the coated substrate. The strength of the effect depends on the thickness of the metal based layer. The effect is more pronounced for thicker metal based layers. The thickness of the dielectric layer has a lesser effect on the R2 aesthetic properties of the coated substrate as compared to the R1 properties.

The dielectric layer of the present invention can be applied using MSVD as discussed above in reference to the metal based layer, as well as CVD and spray pyrolysis methods, which are well known in the art.

Suitable CVD methods of deposition are described in the following references, which are hereby incorporated by reference: U.S. Pat. Nos. 4,853,257; 4,971,843; 5,536,718; 5,464,657; 5,599,387; and 5,948,131.

Suitable spray pyrolysis methods of deposition are described in the following references, which are hereby incorporated by reference: U.S. Pat. Nos. 4,719,126; 4,719,127; 4,111,150 and 3,660,061.

The metal based layer and the dielectric layer discussed above comprise the "basic coating stack" of the present invention and are referred to herein as the "basic metal based layer" and the "basic dielectric layer", respectively. As discussed below, layers of other materials can be incorporated into the basic coating stack to provide different performance properties.

In another non-limiting embodiment, the coating stack of the present invention comprises additional dielectric layers. The coated substrate comprises a first dielectric layer over the substrate, a metal based layer over the first dielectric layer, and a second dielectric layer over the metal based layer.

The first and second dielectric layers have the same composition and thickness as described above in reference to the basic dielectric layer. In a coated substrate having first and second dielectric layers, the R1 and R2 aesthetic properties can be controlled by varying the thickness of the dielectric layers. When the coated substrate of the present invention is used as a member of a multi-ply glazing unit, the coated surface typically faces the interior of the structure within which the window is installed so that the R2 properties are the properties viewed from the exterior of the structure. The primary effect of adjusting the thickness of the second dielectric layer is modifying the R1 color of the coated substrate. The primary effect of adjusting the thickness of the first dielectric layer is modifying the R2 color of the coated substrate. The strength of the effect depends on the thickness of the metal based layer. The effect is more pronounced for thicker metal based layers.

Suitable materials for the metal based layer for this non-limiting embodiment include metals such as tungsten, chromium, tantalum, molybdenum, aluminum, mixtures thereof; and alloys of cobalt and chromium which are commercially available under the Stellite® family of products. The metal based layer can be applied as described above.

The first and second dielectric layers can be applied using conventional techniques such as CVD, spray pyrolysis, and MSVD as discussed above.

In yet another non-limiting embodiment of the invention, an infrared reflective layer and a second metal based layer are included in the coating stack of the present invention. More particularly, the coated substrate of the present invention comprises a first metal based layer over the substrate, an infrared reflective layer over the first metal based layer, a second metal based layer over the infrared reflective layer and a dielectric layer over the second metal based layer. Suitable materials for the infrared reflective layer include metals such as gold, copper, and silver as well as mixtures and alloys thereof.

The composition and thickness of the first and second metal based layers are as discussed above for the basic metal based layer. The metal based layers can be applied as discussed above.

The composition and thickness of the dielectric layer is as discussed above for the basic dielectric layer. The dielectric layer can be applied as discussed above.

The infrared reflective layer can be any thickness. For example, the thickness of the layer of infrared reflective material can range from 1 nm to 50 nm, for example, from 1 nn to 25 nm, or from 2 nm to 20 nm. Generally, the thicker the infrared reflective layer, the lower the emissivity of the coated substrate.

The infrared reflective layer of the present invention can be applied using conventional MSVD techniques as discussed above.

According to the present invention, the various embodiments of the coated substrate exhibit the following performance properties: an emissivity of no greater than 0.8, for example, 0.3 to 0.7 or 0.3 to 0.6, a visible transmittance no greater than 90%, for example 2% to 85% or 5% to 60%, and an R2 visible reflectance of at least 4%, for example, 4% to 70% or 10% to 70%. The coated substrate is also color stable.

Although not required, all of the described embodiments of the present invention can include a protective overcoat as the last layer of the coating stack to provide improved chemical and/or mechanical durability. Examples of suitable protective coatings include, but are not limited to, a layer of coating comprising silicon dioxide, zirconium dioxide, titanium dioxide, niobium dioxide, chromium dioxide and silicon oxynitride as well as mixtures thereof.

Coated substrates according to the present invention can be used in various applications such as automotive applications, architectural applications, etc. In a non-limiting embodiment, the coated substrate of the present invention is included in an insulating glass unit.

In addition to the coated substrates described above, the present invention also encompasses methods for making the coated substrates. In one non-limiting embodiment, the method of the invention comprises depositing a metal based layer selected from tungsten, chromium, tantalum, molybdenum, aluminum, mixtures thereof; and alloys of cobalt and chromium on a substrate; and depositing a dielectric layer comprising $Si_xN_y$, where x/y ranges from 0.75 to 1.5, over the metal based layer.

The present invention further encompasses methods for modifying the R1 and R2 color of a coated substrate by adjusting the thickness of the first or second dielectric layer.

The present invention will be illustrated by the following non-limiting examples.

EXAMPLES

The following non-limiting examples are included to illustrate the present invention. Samples 1-12 were prepared in a conventional laboratory MSVD coater under standard coating conditions. The substrate was a 6 mm thick piece of clear glass. The various configurations of the coating stacks are shown in Table 1. The described coating layers were applied over a substrate from left to right (i.e., the first dielectric layer was applied first, then the metal based layer was applied, etc.) as described in Table 1.

In Samples 3, 4 and 7-12, the first dielectric layer was a multiple film configuration comprised of a first film of silicon nitride, a film of silicon dioxide over the first film of silicon nitride and a second film of silicon nitride over the film of silicon dioxide. More particularly, in Samples 3 and 4, the first dielectric layer was comprised of a 24 nanometer (nm) thick first film of $Si_3N_4$, a 7 nm thick film of silicon dioxide over the first film of silicon nitride and a 24 nm thick second film of silicon nitride over the film of silicon dioxide. In Samples 7 and 8, the first dielectric layer was comprised of a 18 nm thick first film of silicon nitride, a 14 nm thick film of silicon dioxide over the first film of silicon nitride and a 18 nm thick second film of silicon nitride over the film of silicon dioxide. In Samples 9 and 10, the first dielectric layer was comprised of a 18 nm thick first film of silicon nitride, a 28 nm thick film of silicon dioxide over the first film of silicon nitride and a 18 nm thick second film of silicon nitride over the film of silicon dioxide. In Samples 11 and 12, the first dielectric layer was comprised of a 18 nm thick first film of silicon nitride, a 10 nm thick film of silicon dioxide over the first film of silicon nitride and a 18 nm thick second film of silicon nitride over the film of silicon dioxide.

In Samples 1, 2, 5 and 6, the first dielectric layer was comprised of $Si_3N_4$.

The metal based layer for each sample was comprised of Stellite® 6B alloy, and the protective overcoat was comprised of silicon dioxide (if one was present).

TABLE 1

Description of the Coating Configurations for the Various Samples

| Sample | Thickness of the First Dielectric Layer [nm] | Thickness of the Metal based layer [nm] | Thickness of the Second Dielectric Layer [nm] | Thickness of the Protective Overcoat [nm] |
|---|---|---|---|---|
| 1  | 47 | 18 | 38 | 10 |
| 2  | 47 | 17 | 38 |    |
| 3  | 55 | 18 | 38 | 10 |
| 4  | 55 | 17 | 38 |    |
| 5  | 12 | 15 | 37 | 10 |
| 6  | 12 | 14 | 37 |    |
| 7  | 50 | 17 | 37 | 10 |
| 8  | 50 | 16 | 37 |    |
| 9  | 64 | 17 | 37 | 10 |
| 10 | 64 | 16 | 37 |    |
| 11 | 46 | 19 | 43 | 10 |
| 12 | 46 | 18 | 43 |    |

The exemplary coated substrates were subjected to a Taber test to measure the durability of the coated substrates. The Taber test involves imparting a standard level of mechanical exposure to each sample using a Gardner Taber Abraser commercially available from the Paul N. Gardner Company, Inc. in Pompano Beach, Fla. The Taber test was performed as follows. First, a load of 500 grams was employed on both wheels of the Gardner Taber Abraser. The two abrasive wheels on the instrument were specified as Calibrase CS-10F having a specified durometer hardness of 72+5. Second, a 4 inch by 4 inch example was taped at two edges to a 5⅞ inch diameter platen. Third, the sample was abraded 10 cycles, removed from then platen and cleaned using towels and 50/50 solution of isopropanol/deionized water.

The recorded Taber score is then calculated in the following manner: the diffuse reflectance, Y (CIE 1931 Y, x, y chromaticity space), was measured using a TCS Spectrogard calorimeter (commercially available from BYK-Gardner) at four positions around a circle that corresponded to the Taber abrasion track. The Spectrogard calorimeter was run in large aperture "specular-excluded" mode with an Illuminant D65, 2° observer. The average of the four diffuse reflectance measurements was recorded as the Taber score. A higher Taber score indicates more diffuse reflectance from the abrasion track and is interpreted as indicating a greater degree of damage.

A color stability test was also performed on the samples. The chromaticity values (L*a*b* for a CIE standard illuminant D65 and a CIE standard observer angle of 10°) were measured using a Perkin-Elmer Lambda 9 UV/VIS/NIR spectrophotometer prior to heat treatment. Each sample was then heated to a temperature of 1200° F. (649° C.) for 20 minutes and then the chromaticity values were measured again. $\Delta E_{cmc\ (1.5:1)}$ (T), $\Delta E_{cmc\ (1.5:1)}$ (R1) and $\Delta E_{cmc\ (1.5:1)}$ (R2) were calculated from the measured data as described above.

TABLE 2

Performance Properties of Samples 1-12

| Sample | Taber Score | ΔE(T) | ΔE(R1) | ΔE(R2) |
|---|---|---|---|---|
| 1  | 0.09 | 0.96 | 1.22 | 1.22 |
| 2  | 0.08 | 1.01 | 2.11 | 1.64 |
| 3  | 0.06 | 2.07 | 1.52 | 1.62 |
| 4  | 0.09 | 1.08 | 1.32 | 1.70 |
| 5  | 0.04 | 0.63 | 2.40 | 1.18 |
| 6  | 0.08 | 0.93 | 1.51 | 0.56 |
| 7  | 0.07 | 0.99 | 1.49 | 1.32 |
| 8  | 0.08 | 1.00 | 1.33 | 1.44 |
| 9  | 0.07 | 0.93 | 1.54 | 0.64 |
| 10 | 0.09 | 0.89 | 1.50 | 0.84 |
| 11 | 0.09 | 1.17 | 1.12 | 0.74 |
| 12 | 0.07 | 1.68 | 2.10 | 1.00 |

Samples 13-16 were prepared in a conventional laboratory MSVD coater under standard coating conditions. The substrate was 6 mm thick clear float glass. The coating stack of Sample 13 comprised a 25 nm thick first dielectric layer of $Si_3N_4$ over the substrate, a 16 nm thick metal based layer of Stellite®6B alloy over the first dielectric layer, a 35 nm second dielectric layer of $Si_3N_4$ over the metal based layer and a 15 nm thick protective layer of silicon dioxide over the second dielectric layer. The coating stack of Sample 14 comprised a multiple film first dielectric layer over the substrate made up of 16 nm of $Si_3N_4$, 31 nm of silicon oxide over the $Si_3N_4$ and 16 nm of $Si_3N_4$ over the silicon dioxide, a 16 nm thick metal based layer of Stellite®6B alloy over the first dielectric layer, a 35 nm second dielectric layer of $Si_3N_4$ over the metal based layer and a 15 nm thick protective layer of silicon dioxide over the second dielectric layer. The coating stack of Sample 15 comprised a multiple film first dielectric layer over the substrate made up of 70 nm of $Si_3N_4$, 19 nm of silicon oxide over the $Si_3N_4$ and 16 nm of $Si_3N_4$ over the silicon dioxide, a 16 nm thick metal based layer of Stellite®6B alloy over the first dielectric layer, a 35 nm second dielectric layer of $Si_3N_4$ over the metal based layer and a 15 nm thick protective layer of silicon dioxide over the second dielectric layer. The coating stack of Sample 15 comprised a multiple film first dielectric layer over the substrate made up of 70 nm of $Si_3N_4$, 19 nm of silicon oxide over the $Si_3N_4$ and 19 nm of $Si_3N_4$ over the silicon dioxide, a 16 nm thick metal based layer of Stellite®6B alloy over the first dielectric layer, a 35 nm second dielectric layer of $Si_3N_4$ over the metal based layer and a 15 nm thick protective layer of silicon dioxide over the second dielectric layer.

Table 3 shows various performance properties of the samples in an insulating glass unit made up of two, 6 mm clear glass plies with a 12 mm air gap. A coating of the present invention was applied on the #2 surface (i.e., inboard surface of outboard ply). The performance properties were determined using Lawrence Berkeley National Lab's WINDOW 5.2.17 algorithm based on the measured spectrophotometric data.

A color stability test was also performed on the samples. The chromaticity values (L*a*b* for a CIE standard illuminant D65 and a CIE standard observer angle of 10°) were measured using a Perkin-Elmer Lambda 9 UV/VIS/NIR spectrophotometer prior to heat treatment. Each sample was then heated to raise the temperature of the sample to 1150° F. (649° C.) for 20 minutes and the chromaticity values were measured again. The measured data was used to determine color stability via $\Delta E_{cmc\ (1.5:1)}$ (T), $\Delta E_{cmc\ (1.5:1)}$ (R1) and $\Delta E_{cmc\ (1.5:1)}$ (R2) as described above.

TABLE 3

Performance Properties of Samples 13-16

| Sample | Visible Light Transmittance [%] | R2 Visible Reflectance [%] | R1 Visible Reflectance [%] | Shading Coefficient[1] | U-Value [Btu/hr-ft$^2$-° F.][2] | Color (a*, b*) | $\Delta E_{cmc\,(1.5:1)}$ (T) | $\Delta E_{cmc\,(1.5:1)}$ (R1) | $\Delta E_{cmc\,(1.5:1)}$ (R2) |
|---|---|---|---|---|---|---|---|---|---|
| 13 | 17 | 34 | 28 | 0.23 | 0.41 | −2.0, 0.9 | 0.6 | 0.8 | 0.9 |
| 14 | 19 | 31 | 27 | 0.24 | 0.41 | −1.3, −4.1 | 0.6 | 1.0 | 0.3 |
| 15 | 18 | 33 | 26 | 0.25 | 0.42 | −5.6, −16 | 1.1 | 1.0 | 1.3 |
| 16 | 16 | 39 | 26 | 0.24 | 0.41 | −7.2, −5.7 | 1.1 | 0.9 | 1.9 |

[1]Shading coefficient. The SC value was calculated using National Fenestration Research Council (NFRC) summer, daytime standard conditions.
[2]The U-value was calculated using NFRC winter, nighttime standard conditions.

CONCLUSIONS

As can be seen from Table 2, coated substrate according to the present invention exhibits good durability as represented by a Taber score. The exemplary coated substrates exhibited Taber scores of no greater than 0.09. The tested samples also demonstrated excellent color stability as demonstrated by $\Delta E_{cmc\,(1.5:1)}$ (T), $\Delta E_{cmc\,(1.5:1)}$ (R1) and $\Delta E_{cmc\,(1.5:1)}$ (R2). The exemplary coated substrates exhibited a $\Delta E_{cmc\,(1.5:1)}$ (T) of no greater than 2.07, a $\Delta E_{cmc\,(1.5:1)}$ (R1) of no greater than 2.40 and a $\Delta E_{cmc\,(1.5:1)}$ (R2) of no greater than 1.70. As stated above, a coated substrate is "color stable" if the $\Delta E_{cmc\,(1.5:1)}$ (T), a $\Delta E_{cmc\,(1.5:1)}$ (R1) and a $\Delta E_{cmc\,(1.5:1)}$ (R2) of the non-heat treated coated substrate and the heat treated substrate are no greater than or equal to 8 units.

Based on Table 3, it is expected that coated substrates according to the present invention can exhibit the following properties when incorporated into an insulating glass unit as described above: a visible light transmittance no greater than 22%, for example no greater than 19%, an R2 Reflectance no greater than 42%, for example, no greater than 39% or no greater than 35%, an R1 Reflectance no greater than 30%, for example, no greater than 28%, or no greater than 26%, a shading coefficient no greater than 0.30, for example, no greater than 0.28, or no greater than 0.25, a U-Value no greater than 0.45, for example, no greater than 0.42, or no greater than 0.41. The color stability of these exemplary substrates is demonstrated by a $\Delta E_{cmc\,(1.5:1)}$ (T) of no greater than 1.1, a $\Delta E_{cmc\,(1.5:1)}$ (R1) of no greater than 1.0 and a $\Delta E_{cmc\,(1.5:1)}$ (R2) of no greater than 1.9. The substrates can also be produced in a variety of colors as demonstrated by the chromaticity values.

It will be readily appreciated by those skilled in the art that modifications can be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

What is claimed:
1. A coated substrate comprising:
   a. a substrate; and
   b. a coating composition over the substrate comprising:
      i. at least one metal based layer selected from the group consisting of tungsten, chromium, tantalum, molybdenum, aluminum, alloys of cobalt and chromium, and mixtures thereof, wherein each metal based layer independently has a thickness of from 14 nm to 50 nm; and
      ii. at least one dielectric layer comprising $Si_xN_y$, where x/y ranges from 0.75 to 1.5, over and adjacent to the metal based layer,
   wherein the dielectric layer is a multiple film configuration consisting of,
      (i) a first dielectric film comprising $Si_xN_y$ having an index of refraction,
      (ii) a second dielectric film over the first dielectric film, the second dielectric film having an index of refraction that is at least 0.25 lower than the index of refraction of the first dielectric film, where said second dielectric film is silicon dioxide, and
      (iii) a third dielectric film comprising $Si_xN_y$ over the second film.

2. The coated substrate according to claim 1, wherein the metal based layer comprises an alloy of cobalt and chromium.

3. The coated substrate according to claim 1, wherein the first and third dielectric films are the same material.

4. The coated substrate according to claim 3, wherein the first dielectric layer is $Si_3N_4$ and the third dielectric layer is $Si_3N_4$.

5. The coated substrate according to claim 4, wherein the dielectric layer has a thickness of greater than or equal to 5 nm.

6. The coated substrate according to claim 4, further comprising a layer of titanium nitride, chromium nitride, tungsten nitride or mixtures thereof over the dielectric layer.

7. The coated substrate according to claim 1, further comprising a protective overcoat as the last layer of the coating stack, the protective overcoat selected from the group consisting of silicon dioxide, zirconium dioxide, titanium dioxide, niobium dioxide, chromium dioxide, silicon oxynitride and mixtures thereof.

8. The coated substrate according to claim 1, wherein a non-heat treated, coated substrate of claim 1 as compared to a heat treated, coated substrate of claim 1 has a $\Delta E_{cmc\,(1.5:1)}$ (T), a $\Delta E_{cmc\,(1.5:1)}$ (R1) and a $\Delta E_{cmc\,(1.5:1)}$ (R2) no greater than 8 units.

9. The coated substrate according to claim 1, wherein the substrate is glass.

10. The coated substrate according to claim 9, wherein the glass substrate is incorporated into an insulating glass unit.

11. The coated substrate according to claim 10, incorporated into an insulating glass unit, wherein the insulating glass unit exhibits at least one of the following: a visible transmittance of no greater than 90% and an R2 visible light reflectance of greater than 4%.

12. A coated substrate comprising:
   a. a first metal based layer selected from the group consisting of tungsten, chromium, tantalum, molybdenum, aluminum, niobium, mixtures thereof; and alloys of cobalt and chromium over a substrate;

b. an infrared reflective layer over the first metal based layer;
c. a second metal based layer selected from tungsten, chromium, tantalum, molybdenum, aluminum, mixtures thereof; and alloys of cobalt and chromium over the infrared reflective layer; and
d. a dielectric layer over the second metal based layer wherein the dielectric layer comprises $Si_xN_y$, where x/y ranges from 0.75 to 1.5,
wherein the dielectric layer is a multiple film configuration consisting of,
(i) a first dielectric film comprising $Si_xN_y$ having an index of refraction,
(ii) a second dielectric film over the first dielectric film, the second dielectric film having an index of refraction that is at least 0.25 lower than the index of refraction of the first dielectric film, where the second dielectric film is silicon dioxide, and
(iii) a third dielectric film comprising $Si_xN_y$ over the second film,
wherein said first metal based layer and said second metal based layer each independently have a thickness of from 14 nm to 50 nm.

13. A coated substrate according to claim 12, wherein the infrared reflective layer is selected from the group consisting of gold, copper and silver as well as mixtures and alloys thereof.

14. A coated substrate according to claim 12, wherein the infrared reflective layer is silver.

15. The coated substrate according to claim 13, wherein the infrared reflective layer has a thickness ranging from 1 nm to 50 nm.

* * * * *